(12) United States Patent
Ardavanis (10) Patent No.: US 11,149,877 B2
(45) Date of Patent: Oct. 19, 2021

(54) J-LAY GUIDE STRUCTURE

(71) Applicant: Shanghai Zhenhua Heavy Industries Co., Ltd., Shanghai (CN)

(72) Inventor: Kimon Tullio Ardavanis, Sharjah (AE)

(73) Assignee: Shanghai Zhenhua Heavy Industries Co., Ltd., Shanghai (CN)

( * ) Notice: Subject to any disclaimer, the term of this patent is extended or adjusted under 35 U.S.C. 154(b) by 12 days.

(21) Appl. No.: 16/348,798

(22) PCT Filed: Nov. 11, 2017

(86) PCT No.: PCT/EP2017/078945
§ 371 (c)(1),
(2) Date: May 9, 2019

(87) PCT Pub. No.: WO2018/087324
PCT Pub. Date: May 17, 2018

(65) Prior Publication Data
US 2019/0257446 A1    Aug. 22, 2019

(30) Foreign Application Priority Data
Nov. 10, 2016 (GB) .................................... 1619017

(51) Int. Cl.
*F16L 1/19* (2006.01)
*F16L 1/20* (2006.01)
(52) U.S. Cl.
CPC .................................... *F16L 1/19* (2013.01); *F16L 1/20* (2013.01); *F16L 1/207* (2013.01)

(58) Field of Classification Search
CPC ..... F16L 1/19; F16L 1/20; F16L 1/207; F16L 1/235; B63B 35/03
See application file for complete search history.

(56) References Cited

U.S. PATENT DOCUMENTS

| 6,729,803 B1 | 5/2004 | Baylot |
| 6,796,742 B1 | 9/2004 | Roger et al. |
| 2011/0103894 A1* | 5/2011 | Feijen ...................... F16L 1/19 405/166 |

(Continued)

FOREIGN PATENT DOCUMENTS

| GB | 2336191 A | 10/1999 |
| GB | 2460671 A | 12/2009 |
| WO | 2014090980 A1 | 6/2014 |

OTHER PUBLICATIONS

International Search Report issued in International Application No. PCT/EP2017/078945 dated Jan. 29, 2018 (3 pages).

(Continued)

*Primary Examiner* — Sunil Singh
(74) *Attorney, Agent, or Firm* — Osha Bergman Watanabe & Burton LLP (57) ABSTRACT

A guide structure is provided for guiding deployment of a pipeline from a hang-off structure through an opening in a vessel during a J-lay operation. The guide structure comprises a port-side guide assembly and a starboard-side guide assembly for engaging and guiding the pipeline below the hang-off structure, wherein the port and star-board-side guide assemblies are independently moveable to engage and guide the pipeline. The guide assemblies may be mounted to traverse on rails provided within the opening.

17 Claims, 7 Drawing Sheets

(56) References Cited

U.S. PATENT DOCUMENTS

2012/0114419 A1\* 5/2012 Pose ................... F16L 1/23
405/166
2015/0316174 A1\* 11/2015 Inbona ................ F16L 1/207
405/167

OTHER PUBLICATIONS

Written Opinion issued in International Application No. PCT/EP2017/078945 dated Jan. 29, 2018 (7 pages).

\* cited by examiner

J-LAY GUIDE STRUCTURE

BACKGROUND OF THE INVENTION

1. Field of the Invention

The present invention relates to guide structures for guiding deployment of a pipeline from a vessel, in particular during J-lay operation through an opening in the vessel. The invention furthermore relates to a vessel provided with such a guide structure and to a method of operation thereof.

2. Description of the Related Art

Pipe-lay vessels are generally known in various configurations. They may be broadly divided into three main principles of operation, namely J-lay vessels for deep water, near vertical pipe deployment, S-lay vessels for horizontal or low angle deployment and reel-lay vessels. Multi-functional vessels are also known that combine a number of these functionalities.

In J-lay and S-lay operations, successive pipe segments (single joints, double joints, triple joints, quad joints etc.) are welded to the pipe string at a field joint and deployed towards the seabed. In the case of reel lay, a continuous pipe is unwound from a reel with a field joint being provided at the end of each reel.

The assembly of the two pipe ends from the pipe upper section (string) and the catenary (lower section) requires different successive operations including but not limited to: weld preparation; fit up control; preheating; welding; weld cooling; weld inspection; internal or external weld toe modifications; field joint surface preparation; field joint anti-corrosion insulation; and field joint thermal insulation. After completion of the above cycle and in the particular case of J-Lay operations the quad, triple or double joint now welded on the catenary is then lowered in the water. The laying process is controlled based on the required angle of catenary The"laying angle" may be controlled by a stinger with rollers that are generally embedded inside the stinger structure. For S-lay operation, a stinger may extend a considerable distance e.g. from the stern of the vessel. For J-lay operation, the stinger may extend downwards alongside the vessel or through an opening in the vessel. One device of this type has been described in WO2014090980, the content of which is incorporated herein by reference in its entirety. In the case that a stinger is to be used within the confines of an opening in a vessel, the space available is often restricted, especially given that bulky items may need to be passed through the opening.

BRIEF SUMMARY OF THE INVENTION

According to the invention there is provided a guide structure for guiding deployment of a pipeline from a hang-off structure through an opening in a vessel during a J-lay operation, the guide structure comprising a port-side guide assembly and a starboard-side guide assembly for engaging and guiding the pipeline below the hang-off structure, wherein the port and starboard-side guide assemblies are independently moveable to engage and guide the pipeline. Conventional stinger assemblies are unitary in their cross-section although they may comprise a number of separately articulated segments along their length. They generally support the pipeline either from one side or by surrounding the pipeline over the supported length. Their unitary construction may limit their ability to operate in narrow spaces and maintenance on the stinger may require the complete stinger to be refracted. During the period in which the stinger is retracted, pipelaying operation must be interrupted. By forming a guide structure in two segments that are independently moveable, the functionalities of a conventional stinger may be achieved while retaining greater flexibility to adjust, move, retract or otherwise arrange the individual guide assemblies. Although reference is given to port and starboard-side guide assemblies, this is intended merely for designation purposes and it will be understood that these may be oriented across the vessel (as fore and aft guide assemblies) and could equally be designated as first and second guide assemblies.

In a particular embodiment the port and starboard-side guide assemblies are adjustable according to an angle of departure of the pipeline from the vessel. This angle may be anywhere between 90 degrees i.e. vertical and 45 degrees and need only be limited by the limitations imposed either by the opening or by inclination of the J-lay tower. Furthermore, the two guide assemblies may be synchronized to each other or not synchronized and they may be aligned to the J-Lay tower inclination or independent thereof.

The opening in the vessel may either pass through the vessel as a moon pool or may pass partially through the vessel i.e. be open at one side such as at the stern. In the case of a jack-up vessel, the opening may terminate above the waterline. In one preferred configuration, the opening may comprise a tower slot having opposite facing walls extending to below the waterline and the port and starboard-side guide assemblies may be supported by the walls. In general, such walls may be parallel and if this is not the case, the guide assemblies may be supported to be parallel to each other. In this context, the term tower slot is intended to denote an opening that extends beneath the J-lay tower and is longer than it is wide. The J-lay tower may be arranged to pivot about an axis transverse to the slot.

In one embodiment port and starboard-side rails may be provided. These may be mounted on the walls of the slot and the port and starboard-side guide assemblies may be mounted to traverse on the rails. The rails can form part of the present guide structure or may form part of the vessel on which the guide structure is mounted.

The rails may have any appropriate form and may be configured as beams, slots, profiles or combinations of the above, to the extent that they can serve their purpose of permitting traverse of the guide assemblies. Furthermore, they may be single rails or rail assemblies, which may be connected or separate.

In one embodiment, the rails may be curved and the port and starboard-side guide assemblies can traverse on the rails from a substantially vertical pipeline departure angle to an inclined pipeline departure angle. In a still further embodiment, each guide assembly may be provided with two or more rails allowing for greater stability in their support of the guide assembly. The plurality of rails on each side of the slot may be parallel to each other and/or may be curved to be effectively concentric, preferably about the axis of rotation of the J-lay tower. This allows the guide assemblies to rotate as they traverse on the rails. It will nevertheless be understood that configurations with straight rails may also be used whereby rotation of the guide assemblies takes place by other means.

According to one embodiment, the port and starboard-side guide assemblies are independently retractable to a maintenance position above the waterline and preferably out of a splash zone. By ensuring independent retraction, maintenance can be carried out when it is required on one guide assembly without removal of the other guide assembly. This can take place without removal of the pipeline from the slot or opening and may even take place while pipelay continues. It will be understood that pipelay with just one of the guide assemblies may be limited to certain situations, such as pipeline size, radius of curvature or sea conditions.

In order to allow for independent retraction, the port and starboard-side guide assemblies may each be provided with a retraction mechanism for positioning the respective guide assembly with respect to the pipeline for operation or maintenance. The retraction mechanism may be in the form of an actuator, hydraulic cylinder, cable, winch, chain, rack and pinion, climber beam, telescopic beam or any other appropriate construction that can deliver the necessary force to retract the guide assembly from the slot or opening. The retraction mechanisms may be embodied to carry the full-load (or a vector component thereof) of the pipeline against the guide structure during pipelay operation. Alternatively, the guide structure may be arranged to lock into engagement at a position within the slot or opening, whereby the retraction mechanism need only be embodied for the purpose of retraction.

The guide assemblies may be configured according to the specific requirements of the pipeline to be deployed. In one embodiment, the port and starboard-side guide assemblies each comprise one or more roller-box structures having rollers that can engage the pipeline. Additionally or alternatively, the guide assemblies may incorporate a bulky item rail for guiding a bulky item through the opening as will be further described hereinafter. In this context, the roller-box structures are understood to be devices that merely engage and guide the pipeline and are not otherwise capable of supporting the weight of the pipeline.

In one particular embodiment, the port and starboard-side guide assemblies each comprise a frame and the roller-box structures and/or the bulky item rail are mounted on the frame. The frame may be any suitable structure that allows rigid connection of these items such that they can perform their function. Preferably, the frame will occupy as little space within the opening or slot as possible to avoid impeding passage of the pipeline or in particular, bulky items and may be a generally planar structural member arranged parallel to the intended plane of curvature of the pipeline and/or to the walls of the slot. The frame may be in the form of a plate but more preferably will be a construction of bars in the form of a grid, to which the roller box structures can be ruggedly connected. Each roller-box structure may comprise at least one refraction actuator operable to move the roller box structure with respect to the frame between a position for engaging the pipeline and a refracted position. In this manner, a roller box structure may be moved out of the way of the pipeline, either for maintenance or while passing a bulky item. In the case of maintenance, retraction of the roller-box structure may be followed by retraction of the respective frame by operation of the retraction mechanism.

The bulky item rail may be one or more rails, profiles or other forms of guide carried by or forming part of the frame. The roller-box structures may be retracted by their respective retraction actuators to a position distanced from the bulky item rail in order to allow unimpeded passage of a bulky item.

Furthermore each roller-box structure may comprise a plurality of rollers for engaging around the pipeline and an engagement actuator for moving the rollers with respect to each other or to the frame for engagement around the pipeline. The rollers may be generally conventional items or may be specifically designed for the present purpose. By operation of the engagement actuator an angle between respective rollers may be varied from a closed position to an open position. In one embodiment, each roller box structure has two rollers that can be moved from a closed position in which an angle between the rollers is less than 90 degrees to an open position in which an angle between the rollers is more than 120 degrees. Both the retraction actuators and the engagement actuators may be any appropriate actuator for operation of the required mechanism. Most preferably, they will be hydraulic actuators although other arrangements will be familiar to the skilled person that can achieve the required positioning. These actuators may be arranged to lock into a given position to resist forces applied by the pipeline. Alternatively they may be non-locked, whereby they can react to overload as may be required.

In a still further embodiment, a roller-box structure on the port-side guide assembly is arranged to engage the pipeline at the same vertical location as a roller-box structure on the starboard-side guide assembly. In this configuration the two opposing roller-box structures may form a roller-box around the pipeline in their engaged positions. Each roller-box structure may include two rollers whereby the resulting roller-box has four rollers. As previously mentioned, as a result of the independent operation of the port and starboard-side guide assemblies, pipelay operation may continue even if one of the roller-box structures is retracted. In the case they act alone, the remaining rollers may be angled to engage the pipeline in a different manner to when they operate in combination. It may be the that an asymmetric in-line item must be introduced into the pipeline such as a side valve, a T- or a Y-connection. This may be achieved by supporting the pipeline only from the side where there is no protrusion and partially or wholly disengaging the other part of the stinger.

The structure as disclosed may be arranged such that the port and starboard-side guide assemblies can extend in use to a position below the waterline or even to a position beyond the hull of the vessel. The frames as described may extend substantially over the full height of the opening or slot. Their length when extended through the slot may correspond to the length of the slot into which they can be retracted. A number of roller box structures may be arranged at different heights on the frame. The number of roller-box structures will depend on the length of the frame and the degree of guidance required by the pipeline. Furthermore, the roller-box structures may be arranged to extend downwards even beyond the lower edge of the frame.

The invention also relates to a pipelay vessel having a J-lay tower located above a tower slot and a hang-off structure arranged in or above the tower slot for supporting a pipeline during deployment through the slot, the vessel comprising a guide structure located beneath the hang-off structure. The guide structure may be as described above or hereinafter.

Preferably, the J-lay tower can be inclined with respect to the vertical. According to an embodiment of the invention, the guide structure is arranged to engage the pipeline at an angle of departure from the vessel that is independent of the inclination of the J-lay tower.

The invention still further relates to a method of deployment of a pipeline from a pipelay vessel having a pivotable J-layer tower located above a tower slot having walls extending through the vessel, the method comprising: supporting the upper end of the pipeline from a hang-off structure at the base of the tower; aligning an additional pipe segment within the J-lay tower and connecting it to the upper end of the pipeline; deploying the pipeline from the vessel through the slot towards the sea floor; and guiding the pipeline through the slot using a guide structure, adjustably located within the slot. The guide structure may be a guide structure as described above or hereinafter.

The invention still further relates to a vessel for laying a pipeline in J-lay mode, the vessel comprising a J-layer tower, being pivoted to the vessel allowing for angled deployment of the pipeline; a tower slot below the J-lay tower and having walls extending through the vessel, whereby a pipeline can be assembled in the J-lay tower and deployed from the vessel through the slot towards the sea floor; a hang-off structure arranged in or above the slot for supporting the pipeline within the slot; and a guide structure for guiding the pipeline through the slot at a chosen angle of departure from the vessel, the guide structure being supported by the walls of the slot to pivot between a vertical departure position and an angled departure position.

A pipe position and monitoring system (PPMS) may also be provided to monitor the position of the pipeline as it passes through the opening and the guide structure. Signals from the PPMS may be used to control elements of the guide structure e.g. to bring the rollers into engagement with the pipeline, either automatically or under operator guidance. It should be understood that the function of the rollers is generally not to remain in contact with the pipeline but to assume a trumpet-shaped envelope inside which the pipeline can move and bend within allowable stresses. The PPMS provides feedback as to the actual position of the pipeline with respect to the centre of the envelope. Depending on this feed-back, the operator may decide to increase the horizontal or vertical tension in the pipeline in order to better locate it within the envelope formed by the rollers.

BRIEF DESCRIPTION OF THE DRAWINGS

The features and advantages of the invention will be appreciated upon reference to the following drawings of a number of exemplary embodiments, in which:

FIGS. 5a to 5e show plan views of the starboard-side guide assembly in various configurations during operation; and FIGS. 6a to 6c show longitudinal cross-sectional view through the tower slot along line VI-VI of FIG. 4.

DESCRIPTION OF ILLUSTRATIVE EMBODIMENTS

Figure 1:
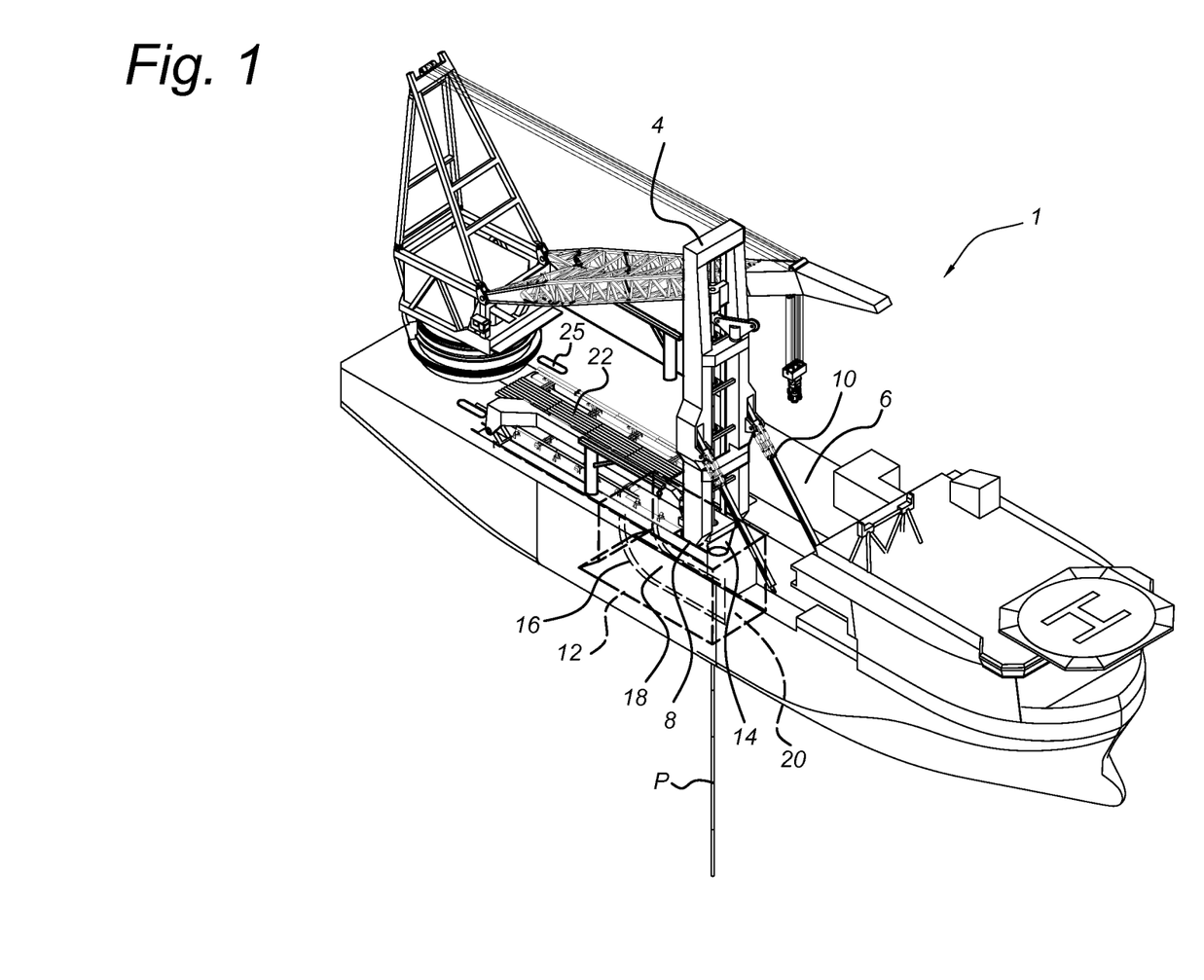
FIG. 1 shows a perspective view of a vessel according to an embodiment of the present invention.

FIG. 1 shows a perspective view of a vessel 1 according to the invention having a J-lay tower 4, pivotally mounted to the deck 6 at tower pivots 8. The elevation of the tower 4 is controlled by struts 10. An elongate tower slot 12 extends in a fore and aft direction and the tower 4 is mounted at the forward end of the slot 12, with the tower pivot 8 aligned across the slot 12. At the base of the tower 4, within the slot 12 is located a hang-off structure 14, sometimes referred to as a hang-off table, from which a pipeline P is suspended. The pipeline P follows a catenary curve towards the seabed and is guided within the slot 12 by a guide structure 16. The tower slot 12 has opposite facing sidewalls 18 extending to below the waterline that together with end walls 20 form a cofferdam defining an enclosed moonpool.

Figure 2:
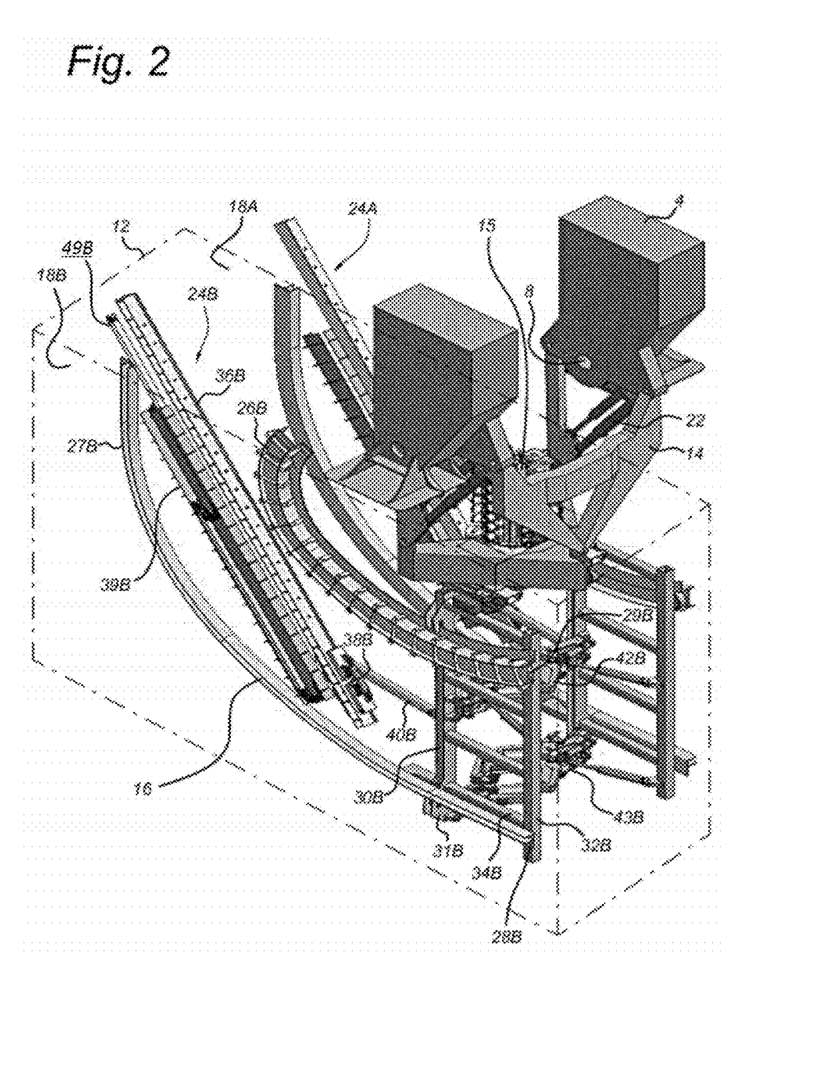
FIG. 2 shows a perspective view of the guide structure of the vessel of FIG. 1.

FIG. 2 is a perspective view of the guide structure 16 seen from the same direction as that of FIG. 1 but with elements of the vessel 1 and the pipeline P omitted for the sake of clarity. According to FIG. 2, the base of the tower 4 is shown at the location of the tower pivots 8. Below this and attached to rotate with the tower 4 is the hang-off structure 14. The hang-off structure 14 is pivotally connected to the base of the tower 4 and provided with hang-off actuators 22 and hang-off grippers. Although not further detailed in the present specification, the skilled person will understand that there are various systems of hang-off gripper including collar clamps, friction pads, indenting pads and wedging pads that may be used to provide this function.

The guide structure 16 is separate from the tower 4 and the hang-off structure 14 and is mounted on the respective port and starboard sidewalls 18A, 18B of the slot 12. The guide structure 16 comprises port and starboard-side guide assemblies 24A, 24B which are substantially mirror images of each other. In the following, only the elements of the starboard-side guide assembly 24B will be further described, which will all be denoted by a reference numeral with B suffix.

The starboard-side guide assembly 24B comprises inner and outer guide rails 26B, 27B mounted on the starboard sidewall 18B. The inner and outer guide rails 26B, 27B are generally parallel to each other and concentric with respect to the tower pivot 8. Mounted on the inner and outer guide rails 26B, 27B is a frame 28B comprising a bulky object rail 30B, a forward rail 32B and transverse rungs 34B. In the embodiment shown, the inner guide rail 26B is the main rail that supports the weight of the frame 28B through inner guide rail rollers 29B. The outer guide rail 27B is engaged by a rail support flange 31B formed at the bottom of the bulky object rail 30B. Also shown attached to the starboard sidewall 18B is climber beam 36B on which rides climber 38B. The climber 38B is attached to the frame 28B by pull-rod 40B. A drag chain 49B, guided by a drag chain guide 39B, provides hydraulic power, sensor input and control signals to the climber 38B. The climber 38B and drag chain 49B are embodied as a fail-safe system that cannot be accidentally disengaged.

Upper and lower roller-box structures 42B, 43B are supported by the frame 28B. Although only upper and lower roller-box structures 42B, 43B are included in the illustrated embodiment it will be understood that additional structures can be provided at intermediate levels.

Figure 3:
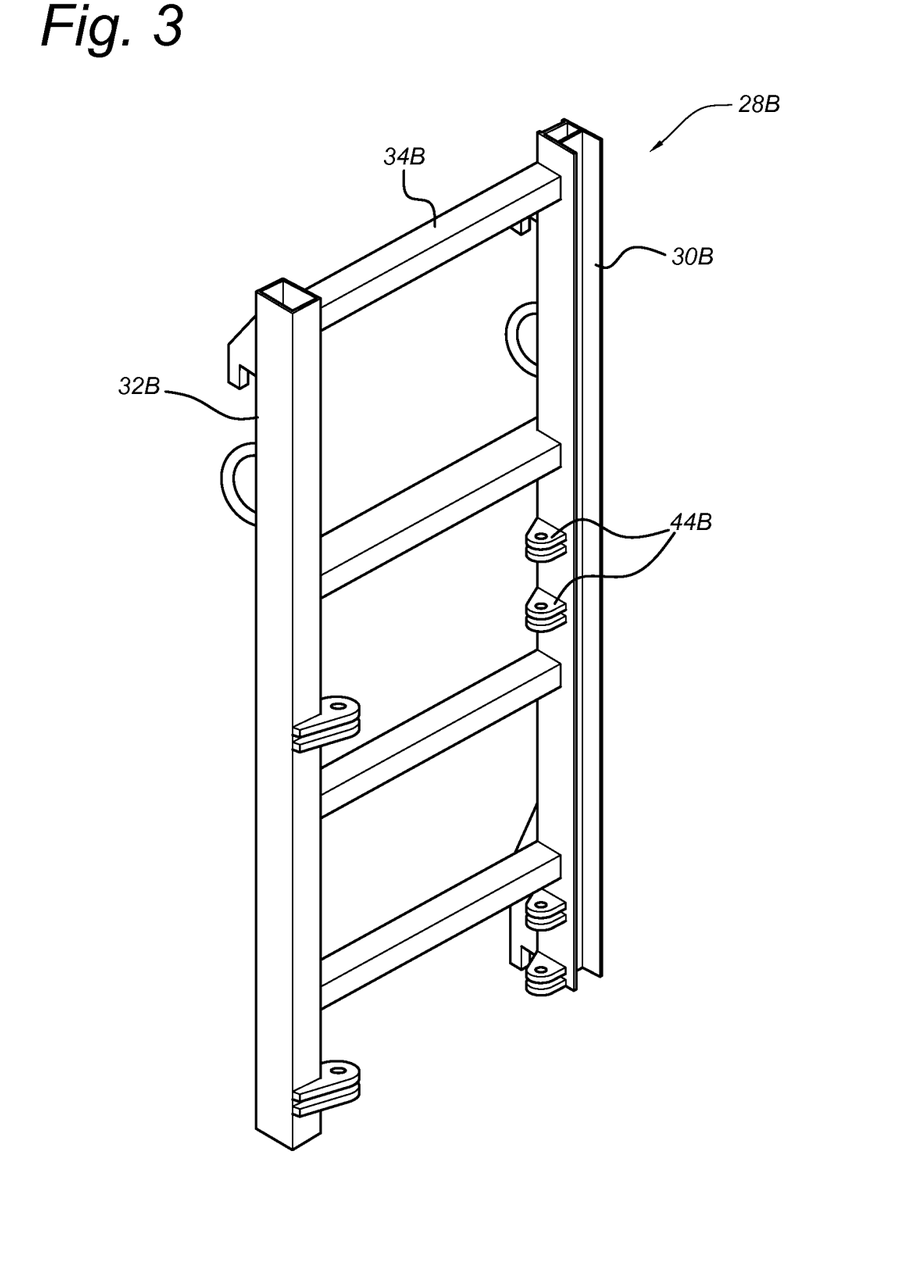
FIG. 3 shows a perspective view of one of the frames of the guide structure of FIG. 2.

FIG. 3 shows a perspective view of the frame 28B viewed from the port-side direction showing the bulky object rail 30B, the forward rail 32B and the transverse rungs 34B. Welded to the frame 28B are a plurality of clevis 44B for attachment of actuators for the upper and lower roller-box structures 42B, 43B.

Figure 4:
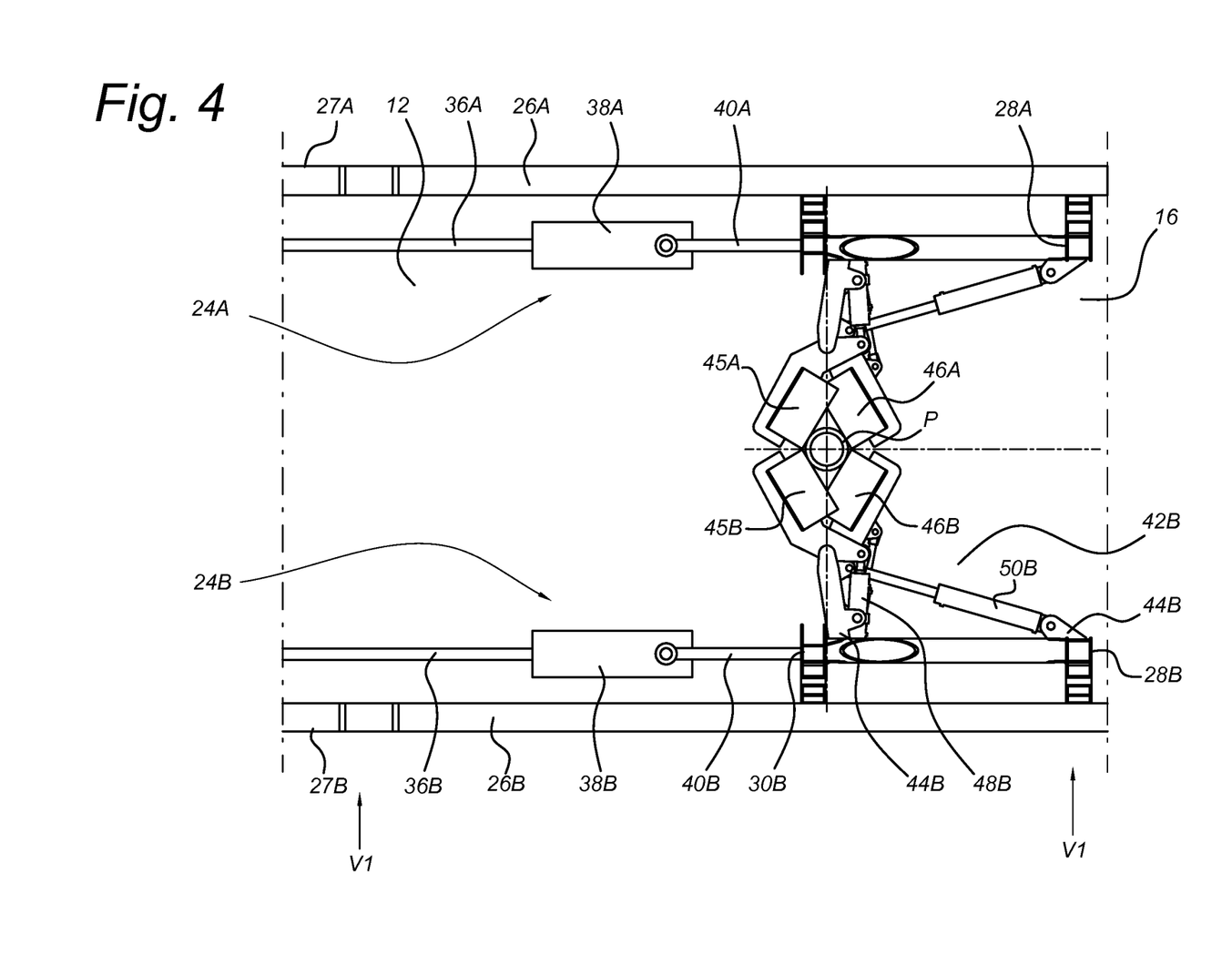
FIG. 4 shows a plan view of the tower slot of FIG. 2.

FIG. 4 shows a plan view of the tower slot 12 with the guide structure 16 in position around the pipeline P. Elements of the tower and the hang-off structure are omitted for the sake of clarity. The frames 28A, 28B are engaged in their respective inner and outer guide rails 26A,B, 27A,B and are connected by pull-rods 40A, B to climbers 38A, B on climber rails 36A,B. In this view, the upper roller-box structure 42B can be seen comprising rollers 45B, 46B, which are articulated to the bulky object rail 30B of the frame 28B at clevis 44B. Engagement actuators 48B and retraction actuator 50B are also connected to the rollers 45B, 46B and a respective clevis 44B for actuation as will be further described below. The rollers 45B, 46B are 750 mm diameter steel rollers coated with a 100 mm thick polyurethane layer to ensure minimum friction with the pipeline P. The rollers 45B, 46B of the starboard-side guide assembly 24B and the rollers 45A, 46A on the port-side guide assembly 24A engage together around the pipeline P to form a roller-box 45A, 46A, 45B, 46B.

Operation of the guide structure 16 in allowing passage of a pipeline P and a bulky item BI will now be explained with reference to FIGS. 5a to 5e, which show plan views of the starboard-side guide assembly 24B in various configurations. It will be understood that the port-side guide assembly 24A may also be present but is not shown in this view for the sake of clarity.

Figure 5A:
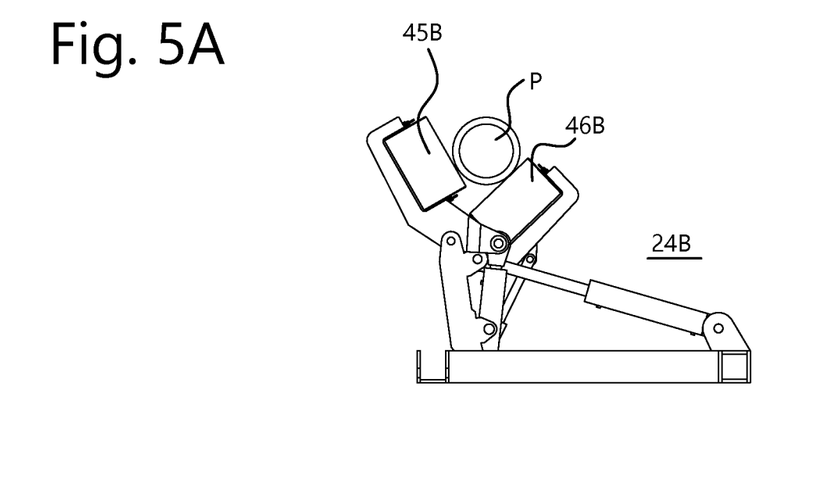

According to FIG. 5a, the rollers 45B, 46B are in contact with the pipeline P in the configuration corresponding to FIG. 4. The pipeline P may be advanced as is otherwise conventional in the case of J-lay operation by introduction of a new pipe section within the tower 4 and formation of a field joint with the pipeline catenary. The pipeline P can then be lowered by a travelling block (not shown) and subsequently supported by the hang-off structure 14.

Figure 5B:
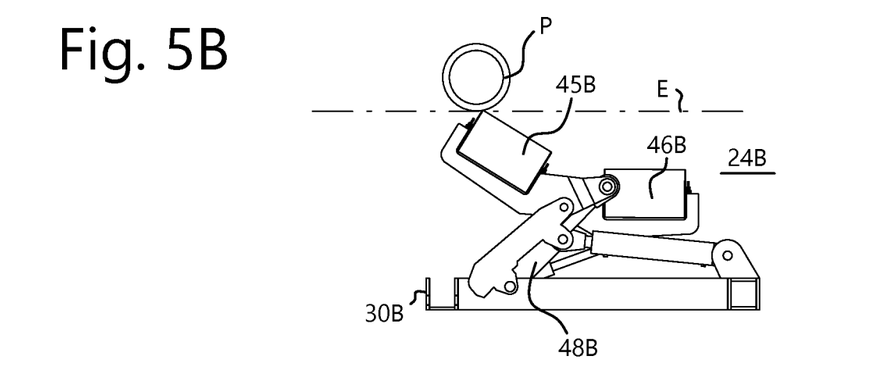

In FIG. 5b, the rollers 45B, 46B have been disengaged by operation of the engagement actuators 48B, to a position at which they are spaced from the envelope E of the pipeline P (the projection of the pipeline in the fore-aft direction of the vessel). In this position, the starboard-side guide assembly 24B can be retracted as will be explained further below and is furthermore free to move in order to ensure alignment of the bulky item rail 30B with the corresponding guide (not shown) of the J-lay tower. For passage of a bulky item BI, the hang-off structure 14 must be retracted by operation of the hang-off actuators 22 of FIG. 2 (not shown in these views). It will be understood that the hang-off structure 14 may also be provided with a bulky item guide that aligns with the bulky item rail 30B in its retracted position.

Figure 5C:
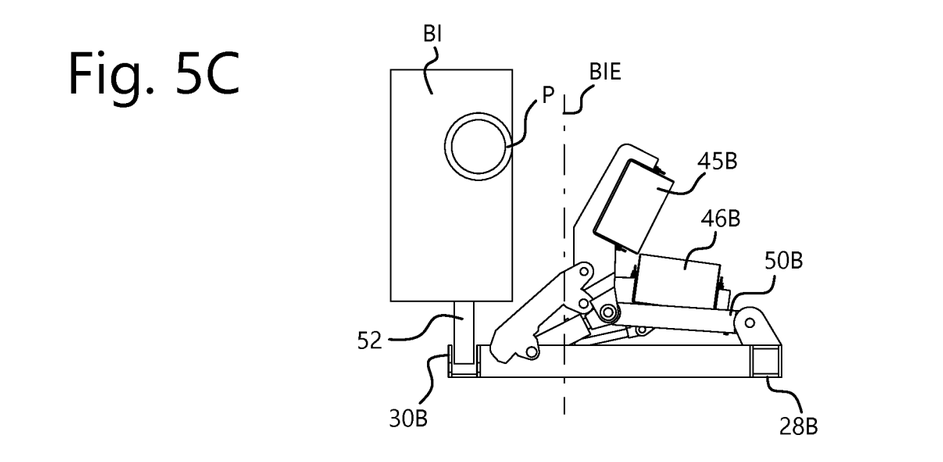

In FIG. 5c, the rollers 45B, 46B have also been retracted by operation of the retraction actuators 50B to a position such that they are outside the bulky item envelope BIE. A bulky item BI has engaged with its trunnions 52 in the bulky item rail 30B of the frame 28B. Although not shown, it is noted that the bulky item rail 30B may be flared to facilitate entry of the bulky item trunnions 52.

Figure 5D:
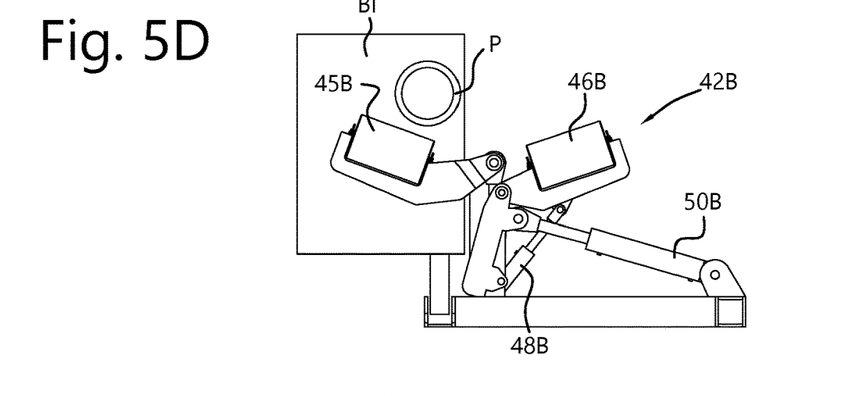

In FIG. 5d, the bulky item BI has passed the upper roller-box structure 42B and the retraction actuator 50B and engagement actuators 48B are again activated in order to move the rollers 45B, 46B back into engagement with the pipeline P. The roller-box structures 42B, 43B are designed with additional degrees of freedom and built-in redundancy such that the rollers 45B, 46B can be moved out of the envelope of the pipeline even if one of the engagement or refraction actuators 48B, 50B has failed.

Figure 5E:
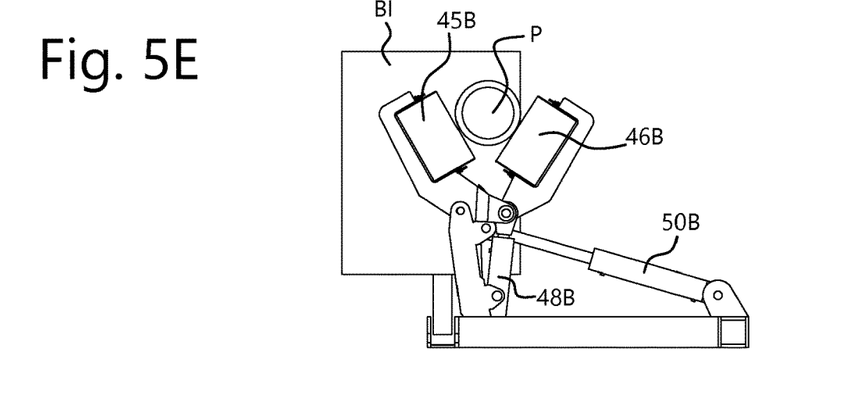

In FIG. 5e, the rollers 45B, 46B have been moved to a position where they engage the pipeline P alone, without additional guidance from the port-side guide assembly 24A. This may be the case when the port-side guide assembly 24A has been retracted to a maintenance position as will be described in further detail below.

Figure 6A:
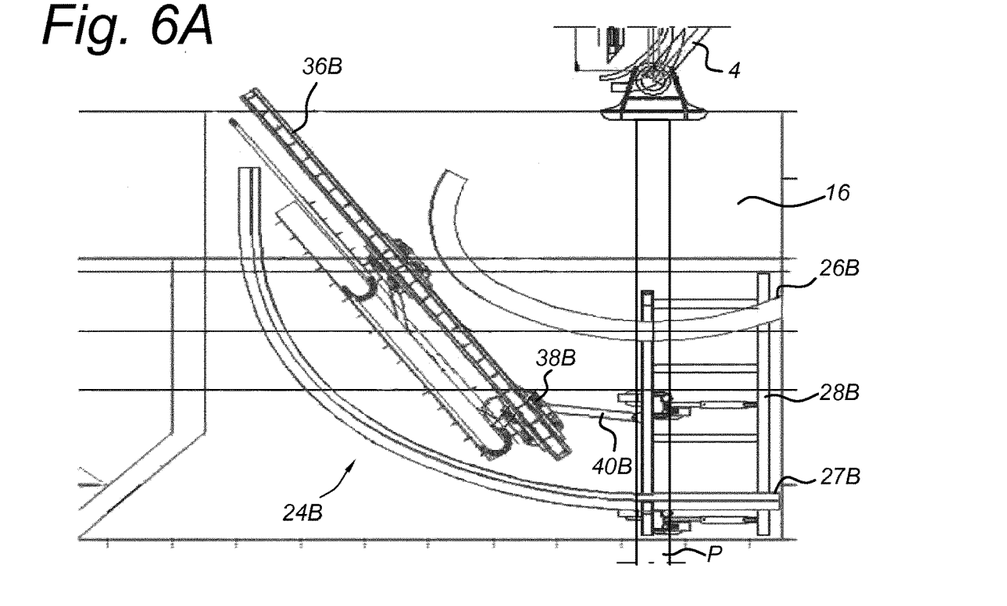
Figure 6B:
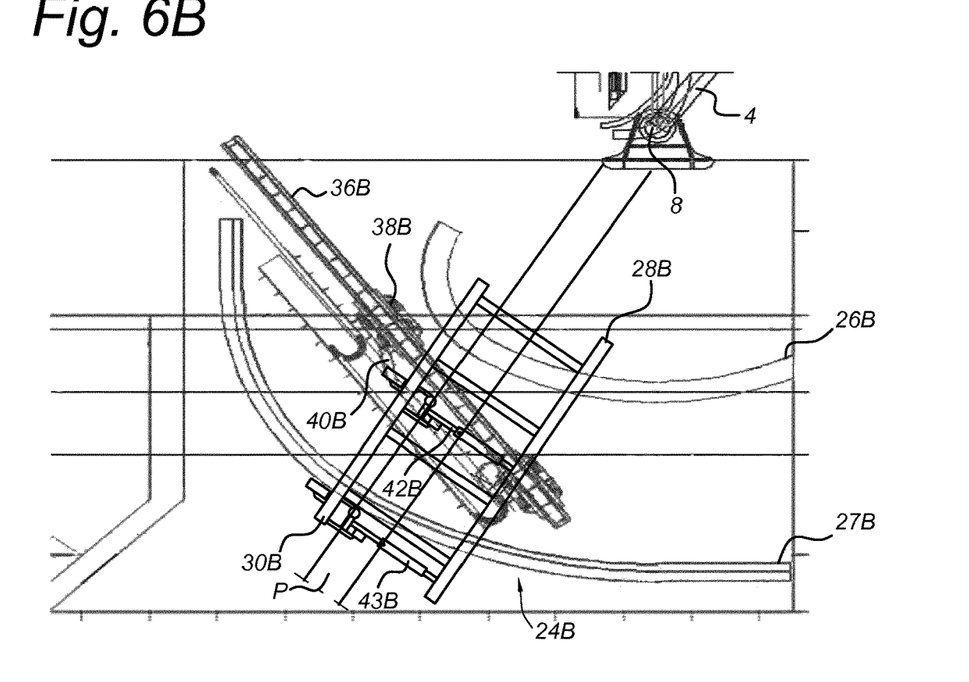
Figure 6C:
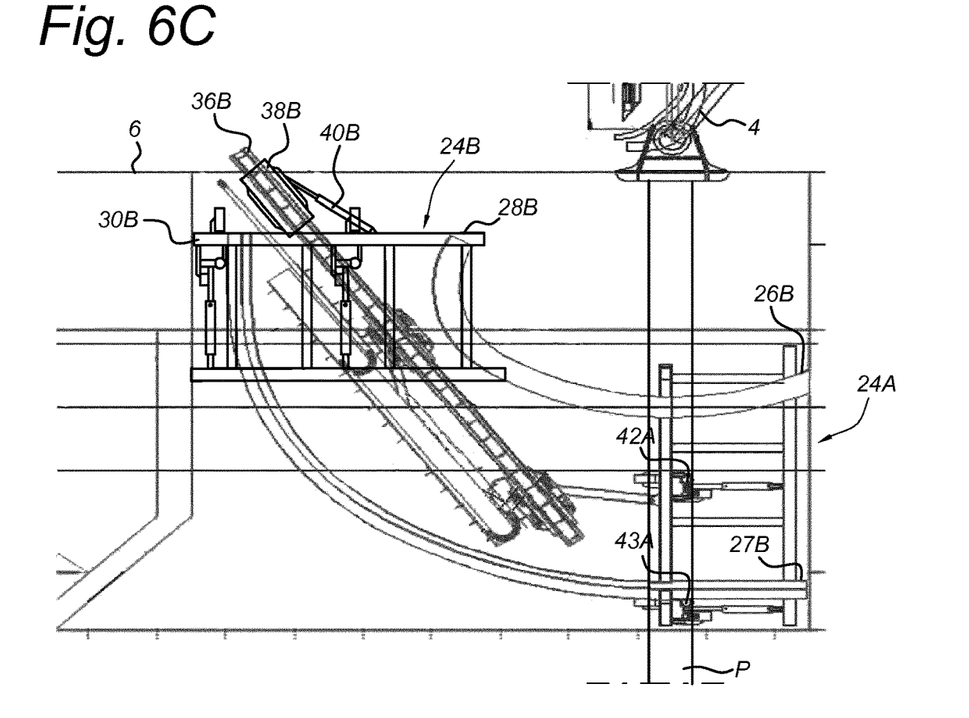

FIGS. 6a to 6c show longitudinal cross-sections through the tower slot 12 in the direction VI-VI in FIG. 4 in various conditions of operation. The description is limited to details of the starboard-side guide assembly 24B and the port-side guide assembly 24A is not shown unless required. Other items such as the hang-off structure have been omitted for the sake of clarity.

In FIG. 6a, the guide structure 16 is located to guide the pipeline P below the J-lay tower 4, which is in a position for vertical deployment. The frame 28B, mounted on the inner and outer guide rails 26B, 27B is held in position by pull-rod 40B attached to climber 38B, which is located at the lower end of climber beam 36B. The pipelay operation proceeds as earlier described in relation to FIG. 5, whereby passage of the pipeline P and any bulky item BI is guided by the (port and) starboard-side guide assembly 24B.

FIG. 6b shows a view similar to that of FIG. 6a in which pipelay operation takes place at an inclination of the tower 4. In this configuration, the starboard-side guide assembly 24B can be seen rotated to the desired departure angle of the pipeline P. The climber 38B, has been raised along the climber beam 36B, whereby the pull-rod 40B causes the frame 28B to traverse along the guide rails 26B, 27B. The curvature of the guide rails 26B, 27B is such that the frame 28B also rotates around the tower pivot 8. It will be noted that perfect alignment of the frame with the tower pivot 8 is not required for pipelay operation, given the degree of flexibility provided by the roller-box structures 42B, 43B. Nevertheless, for passage of a bulky item, more accurate alignment between the bulky item rail 30B and the J-lay tower 4 may be required and the bulky item rail 30B may therefore be chosen as the reference for rotation of the frame 28B about the tower pivot 8.

FIG. 6c shows a view similar to that of FIG. 6a, with pipelay taking place at a near vertical deployment angle but with the starboard-side guide assembly 24B rotated to a maintenance position. In this view, the port-side guide assembly 24A can be seen in the active position with the roller-box structures 42A, 43A engaging the pipeline P. In this case, engagement takes place in the manner shown in FIG. 5e. The starboard-side guide assembly 24B has been traversed along guide rails 26B, 27B by action of the climber 38B on frame 28B through pull-rod 40B. In the position shown, the climber 38B is at the uppermost end of climber beam 36B and the frame 28B is effectively horizontal with the bulky item rail 30B parallel with the deck 6. In order to move to this position, it will be understood that the rollers 45B, 46B will have been disengaged from the pipeline P by operation of the engagement actuators 48B and will have been moved out of its envelope to the position shown previously in FIG. 5b. In the maintenance position, the frame 28B is out of the splash zone and can be accessed by personnel for repairs and service. It may also be removed and replaced should this be required. Pipelay operation may proceed whereby the pipeline P is guided only by the port-side guide assembly 24A. Although not shown, it will be understood that both of the guide assembly 24A, 24B may be retracted to the maintenance position. Once pipelay has been terminated, this may allow the vessel to transit with the tower slot 12 closed.

Thus, the invention has been described by reference to certain embodiments discussed above. It will be recognized that these embodiments are susceptible to various modifications and alternative forms well known to those of skill in the art. In particular, the arrangement of rails, frames and guides implemented may be distinct from the schematically illustrated design.

Many modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. A guide structure for guiding deployment of a pipeline from a hang-off structure through an opening in a vessel during a J-lay operation, the guide structure comprising a port-side guide assembly and a starboard-side guide assembly for engaging and guiding the pipeline below the hang-off structure;

wherein the port and starboard-side guide assemblies are independently moveable to engage and guide the pipeline, and wherein the opening comprises a tower slot having opposite facing walls extending to below the waterline, and the port and starboard-side guide assemblies are supported by the walls.

2. The structure according to claim 1, wherein the port and starboard-side guide assemblies are adjustable according to an angle of departure of the pipeline from the vessel.

3. The structure according to claim 1, comprising port and starboard-side rails mounted on the walls, wherein the port and starboard-side guide assemblies are mounted to traverse on the rails.

4. The structure according to claim 3, wherein the rails are curved and the port and starboard-side guide assemblies can traverse on the rails from a substantially vertical pipeline departure angle to an inclined pipeline departure angle.

5. The structure according to claim 1, wherein the port and starboard-side guide assemblies are independently retractable to a maintenance position above the waterline and out of a splash zone.

6. The structure according to claim 1, wherein the port and starboard-side guide assemblies are each provided with a retraction mechanism for positioning the respective guide assembly with respect to the pipeline for operation or maintenance.

7. The structure according to claim 1, wherein the port and starboard-side guide assemblies each comprise one or more roller-box structures having a plurality of rollers that can engage the pipeline and/or a bulky item rail for guiding a bulky item through the opening.

8. The structure according to claim 7, wherein the port and starboard-side guide assemblies each comprise a frame and the roller-box structures and/or the bulky item rail are mounted on the frame.

9. The structure according to claim 7, wherein each roller-box structure comprises at least one retraction actuator operable to move the roller-box structure with respect to a frame between a position for engaging the pipeline and a retracted position from the bulky item rail to allow unimpeded passage of the bulky item.

10. The structure according to claim 7, wherein each roller-box structure comprises the plurality of rollers for engaging around the pipeline and an engagement actuator for moving the plurality of rollers with respect to each other or to a frame for engagement around the pipeline.

11. The structure according to claim 7, wherein at least one roller-box structure of the one or more roller-box structures on the port-side guide assembly engages the pipeline at the same vertical location as a roller-box structure on the starboard-side guide assembly.

12. The structure according to claim 1, wherein the port and starboard-side guide assemblies are arranged to extend in use to a position below the waterline or even to a position beyond the hull of the vessel.

13. A pipelay vessel having a J-lay tower located above a tower slot and a hang-off structure arranged in or above the tower slot for supporting a pipeline during deployment through the slot, the vessel comprising a guide structure according to claim 1 located beneath the hang-off structure.

14. The pipelay vessel according to claim 13, wherein the J-lay tower can be inclined with respect to the vertical and the guide structure engages the pipeline at an angle of departure from the vessel that is independent of the inclination of the J-lay tower.

15. A method of deployment of a pipeline from a pipelay vessel having a pivotable J-layer tower located above a tower slot having walls extending through the vessel, the method comprising:

supporting an upper end of the pipeline from a hang-off structure at a base of the tower;

aligning an additional pipe segment within the J-lay tower and connecting it to the upper end of the pipeline;

deploying the pipeline from the vessel through the slot towards the sea floor;

guiding the pipeline through the slot using a guide structure, adjustably located within the slot, wherein the walls extending to below the waterline, and the guide structure comprises port and starboard-side guide assemblies supported by the walls.

16. The method of claim 15, wherein the guide structure guides deployment of the pipeline from the hang-off structure through an opening in the vessel during a J-lay operation, wherein the guide structure comprises the port-side guide assembly and the starboard-side guide assembly for engaging and guiding the pipeline below the hang-off structure, wherein the port and starboard-side guide assemblies are independently moveable to engage and guide the pipeline, and wherein the opening comprises the tower slot having opposite facing walls extending to below the waterline, and the port and starboard-side guide assemblies are supported by the walls.

17. A vessel for laying a pipeline in J-lay mode, the vessel comprising:

a J-layer tower, the tower being pivoted to the vessel allowing for angled deployment of the pipeline;

a tower slot below the J-lay tower and having walls extending through the vessel, whereby the pipeline can be assembled in the J-lay tower and deployed from the vessel through the slot towards the sea floor;

a hang-off structure arranged in or above the slot for supporting the pipeline within the slot; and a guide structure for guiding the pipeline through the slot at a chosen angle of departure from the vessel that is independent of the inclination of the J-lay tower, the guide structure being supported by the walls of the slot to pivot between a vertical departure position and an angled departure position.

* * * * *